United States Patent [19]

Walsh

[11] Patent Number: 4,654,761

[45] Date of Patent: Mar. 31, 1987

[54] PERISCOPIC VEHICLE LAMP LENS AND LENS ARRANGEMENT INCLUDING SAME

[75] Inventor: Phillip D. Walsh, Anderson, Ind.

[73] Assignee: General Motors Corporation, Detroit, Mich.

[21] Appl. No.: 834,782

[22] Filed: Feb. 28, 1986

[51] Int. Cl.[4] .......................... B60Q 1/00; F21V 7/00; F21V 5/00; F21V 11/00

[52] U.S. Cl. ...................................... 362/80; 362/308; 362/329; 362/335; 362/351

[58] Field of Search ................. 362/80, 290, 292, 293, 362/296, 297, 298, 299, 300, 308, 309, 327, 328, 329, 351, 244, 335

[56] References Cited

U.S. PATENT DOCUMENTS

| | | | |
|---|---|---|---|
| 1,937,912 | 12/1933 | Parker | 362/293 |
| 2,102,928 | 12/1937 | VanLeunen | 362/290 |
| 2,197,149 | 7/1939 | Grote | 362/327 |
| 2,283,598 | 5/1942 | Decalian | 362/329 |
| 2,286,201 | 6/1942 | Farrand et al. | 362/335 |
| 2,813,971 | 11/1957 | Pickett | 362/327 |
| 3,267,278 | 8/1966 | Doolittle | 362/329 |
| 3,451,876 | 6/1969 | Edelmann et al. | 362/293 |
| 3,487,206 | 12/1969 | Dawson et al. | 362/80 |
| 3,497,687 | 2/1970 | Hermann | 362/244 |
| 3,907,249 | 10/1959 | Hjermstad | 362/329 |
| 4,041,303 | 8/1977 | Ricard | 362/244 |

*Primary Examiner*—Raymond A. Nelli

*Attorney, Agent, or Firm*—D. D. McGraw

[57] ABSTRACT

A periscopic lens in a lamp assembly in which parallel light rays are twice reflected and pass through optical surfaces which control the light distribution pattern beyond the lamp assembly. The light rays enter the lens and emerge only from alternate lens facet surfaces, with the surfaces or facets alternating therebetween being so arranged as to present the same color as that of adjoining vehicle body panels to visually merge the lamp assembly with the coloration of the body panels and present a continuous appearance while the lamp assembly is not energized. At the same time it permits the lamp assembly to be seen as needed when it is energized. Optical surfaces are provided which establish a desired light distribution pattern which may be other than diffusion beyond a light ray focal point.

8 Claims, 6 Drawing Figures

PERISCOPIC VEHICLE LAMP LENS AND LENS ARRANGEMENT INCLUDING SAME

The invention relates to a lamp lens in a vehicle lamp assembly. In the preferred embodiment the lamp assembly including the lamp lens is provided as a vehicle running light assembly. It may, for example, be a running light which is energized any time that the vehicle head lamps or parking lamps are energized, a brake lamp, a back-up lamp, a turn signal indicator, or several such lamps in a common assembly. The invention particularly relates to a periscopically constructed lamp lens and a lens arrangement.

One of the styling concepts that is desirable is that of a vehicle running light assembly which appears to merge with the adjacent vehicle body panels so as to appear like a body panel when the running lamp is not energized. The lamp bulb in the lamp assembly when energized is nevertheless permitted to perform its desired function such as being visible for signaling purposes.

Vehicle lamp assembly light bulbs have been mounted inside translucent body panels which conceal the lamp while transmitting light from the lighted lamp to the vehicle exterior to provide a signaling function such as a brake light or a turn signal. Such an arrangement requires a very high intensity light bulb to generate sufficient light to overcome the relatively dark translucence of the covering body panel, and usually such lights have an impaired function because it is undesirable to provide such an electrical draw on the vehicle system.

Other systems have provided an opaque body panel with a plurality of transparent interstices or slits which permit the passage of light therethrough, using a plurality of lens means which focus the light from the lamp assembly light source at the interstices. Light from the lamp source is reflected by a reflector and passes through the focusing lens means so that the focal point of the light rays passing therethrough is at an interstice. The light rays so passing through the interstices are then diffused to the same extent that the lens means has redirected the light rays to make them pass through the focal point. Examples of this type of arrangement are disclosed in U.S. Pat. Nos. 2,102,928 entitled "Illuminating Device", issued December 21, 1937; 2,286,201 entitled "Opague Apertured Signal Lens", issued June 16, 1942; 2,907,249 entitled "Lens for Signal Lights", issued October 6, 1959; and 3,487,206 entitled "Concealed Vehicle Running Light Assembly", issued December 30, 1969.

It has also been proposed to provide a transparent plastic panel having an opaque color grid extending coextensively therewith. The grid is made of finely woven wire cloth or strands of wire arranged in a crisscross configuration or as parallel color grid elements. The grid is dimensioned so that the panel is opaque over 30 to 50 percent of its area, with the remaining area being able to let light pass therethrough. Thus the light reflected by the light bulb passes between the grid elements to perform the signaling function. Arrangements of this type are shown in U.S. Pat. Nos. 1,850,365 entitled "Light Diffusing Device", issued March 22, 1932; and 3,514,589 entitled "Concealed Vehicle Running Light Assembly", issued May 26, 1970. In the latter patent, glass beads are placed on the lens to prevent double reflection of light from the exterior of the lamp assembly to the interior and then back to the exterior. The beads diffuse the light if it enters through the grid and tend to return that light to the exterior.

It is also known to provide baffles in a lamp assembly which prevent light from passing upwardly, for antiglare purposes. This is shown in U.S. Pat. 2,813,971 entitled "Headlight for Vehicles", issued November 19, 1957. In that patent, the light rays which would have gone upwardly are reflected away from the exterior and dissipated within the lamp assembly.

A lens with double faceted sides is shown in U.S. Pat. 2,283,598 entitled "Illuminating Apparatus", issued May 19, 1942. However, that lens has no periscopic or double reflecting capability. It merely directs light therethrough much like a Fresnel lens. The same is true of the lens shown in FIG. 7 of U.S. Pat. 3,497,687 entitled "Lens Attachment for Automobile Headlights", issued February 24, 1970.

The lens and lens arrangement embodying the invention herein disclosed and claimed involves a periscopic lamp lens with a transparent body having an inner surface on one side which is facing the light bulb and reflector of the lamp assembly so that parallel light rays are received thereby. The lens body has an outer surface on the other side which faces the outer side of the lamp assembly. The inner surface of the lens body is formed with alternating first and second series of flat facets or surfaces which are angularly joined at their adjacent edges at about a 45° angle. When the lens is placed in the lamp assembly it is positioned so that it is substantially perpendicular to the paths of parallel light rays from the reflector of the lamp assembly. Thus these light rays can enter the lens body through the first series of facets. The second series of flat facets have a mirrored surface treatment facing the interior of the lens body. The lens body outer surface has alternating third and fourth series of facets which are also angularly joined at their adjacent edges at about a 45° angle. The third series of facets, which may be flat or optically curved, are generally perpendicular to the extended paths of the parallel light rays, and therefore generally parallel to the first series of flat facets. The third series of facets is so positioned with respect to the second series of flat facets that none of the parallel light rays reflected from the reflector to the lens may directly engage the third series of facets because the second series of flat facets block those light rays from continuing therebeyond on their extended paths. The fourth series of facets is made up of flat facets which are parallel to the second series of flat facets. They also have a mirrored surface treatment facing the interior of the lens body and are so positioned with respect to the first series of flat facets that when the parallel light rays pass through the first series of flat facets and the lens body to the mirrored surfaces of the fourth series of facets, the light rays are reflected back through the lens body to the mirrored surfaces of the second series of flat facets. These facets in turn reflect the light again through the lens body and through the third series of facets. The light rays then pass outwardly of the lens and outwardly of the lamp assembly.

It is a more particular feature of the invention to have the third series of facets provided with optical surfaces which redirect the light rays beyond the lens so that a desired light distribution pattern beyond the lamp assembly is obtained. In other instances the third series of facets are made of flat facets, and an outer lens is provided with optical surfaces which redirect light rays to obtain a desired light distribution pattern beyond the lamp assembly.

By this arrangement, the light rays exiting the lamp assembly may be precisely controlled. The parallel light rays are not required to be focused at focal points coincident with thin slits so that they are able to pass through the thin slits and then be diffused outwardly. Desirable exterior light patterns other than light diffusion are obtainable. Therefore better light pattern control may be arranged and obtained than heretofore.

It is another feature of the invention to have the outer surfaces of the fourth series of facets, on the opposite side thereof from the mirrored surfaces, painted or otherwise treated so that they are the same color as the adjacent vehicle body panels so that the assembly gives an overall appearance of a colored body panel with the lamp assembly being concealed when the light bulb therein is not energized.

It is another feature of the invention that an appropriate color of light exiting the assembly may be provided with a third lens located between the light bulb and the periscopic lens, for example, the third lens being of a desired color such as red or yellow. In some instances it may be desirable to color the body of the periscopic lens for this purpose rather than provide a third lens for color only.

IN THE DRAWING

Figure 1:
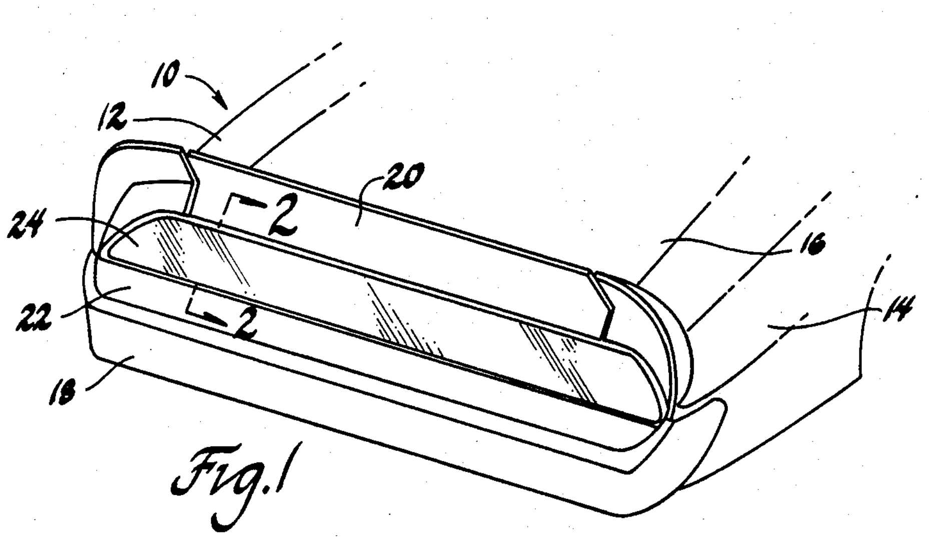
FIG. 1 is an isometric view of one end of an automotive vehicle having a running light assembly which includes a concealing panel arrangement and is constructed in accordance with the invention.

The automotive vehicle 10 of FIG. 1 has a rear portion thereof illustrated, that portion including body panels 12 and 14 which are rear quarter panels, a deck lid 16, a bumper 18, and upper and lower end panels 20 and 22. A panel 24 is positioned between the upper and lower end panels 20 and 22 and conceals one or more rear lamp assemblies of the vehicle. Typically, such assemblies include parking lamps, running lamps which are turned on concurrently with the vehicle head lamps and which may also act as clearance lamps, turn signal lamps, and back-up lamps. As is well known, more than one of these functions may be combined in one lamp assembly for either side of the vehicle. In some instances, the lamp assembly may function across the entire width of the vehicle with several lamp and reflector sectors.

In the preferred embodiment the panel 24 is also the outer lens of the lamp assembly. In other instances it may be a covering panel and the required lens arrangement in the lamp assembly may be completely covered by panel 24.

Figure 2:
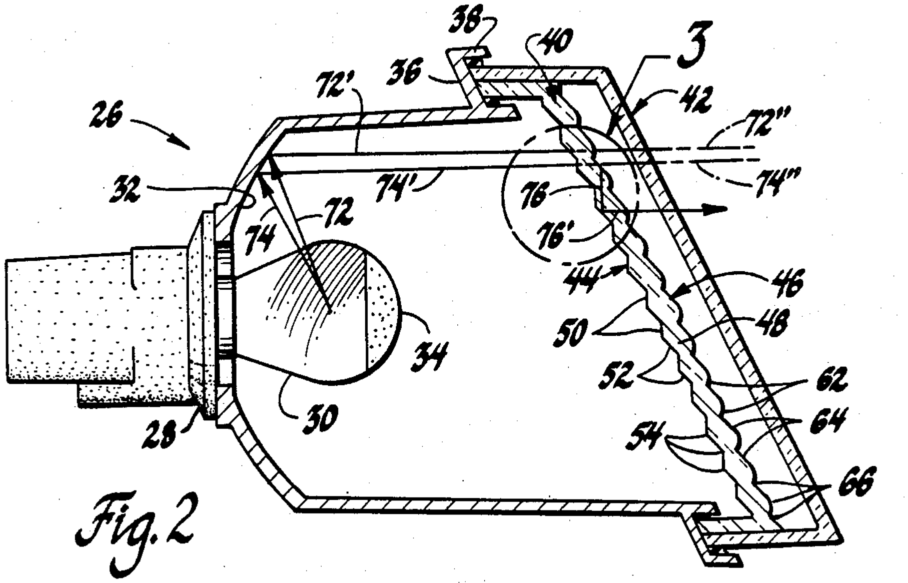
FIG. 2 is a cross-section view of the lamp assembly of FIG. 1 taken in the direction of arrows 2—2 of that Figure and having parts broken away.

FIG. 2 shows a lamp assembly positioned at the left rear portion of the vehicle behind the concealing panel 24. The lamp assembly 26 is illustrated somewhat schematically as including a base 28 in which a light bulb 30 is mounted with its filament at the focal point of the reflector 32. Light bulb 30 may be of the light shielded type with a built-in light shield 34, if desired. However, such a shield is not necessary to the practice of the invention herein disclosed and claimed. The reflector 32 is illustrated as forming a part of the light assembly housing 36, which is provided at its outer end 38 with suitable arrangements for securing one or more lens elements as will be further described.

The periscopic lens 40 is mounted to the housing outer end 38 in a suitable manner. An outer lens 42, which may be a separate lens or may be a part of panel 24, is also secured in place so that at least portions of its mounting are received by the housing outer end 38 to locate lens 42 in relation to lens 40. It is therefore noted that lens 40 is positioned intermediate the light bulb 30 and the outer lens 42 and it is also intermediate the reflector 32 and the outer lens 42.

Periscopic lens 40 has an inner surface 44 on the side facing light bulb 30 and reflector 32. It has an outer surface 46 on the other side thereof facing the exterior of lamp assembly 26 and the outer lens 42.

Figure 3:
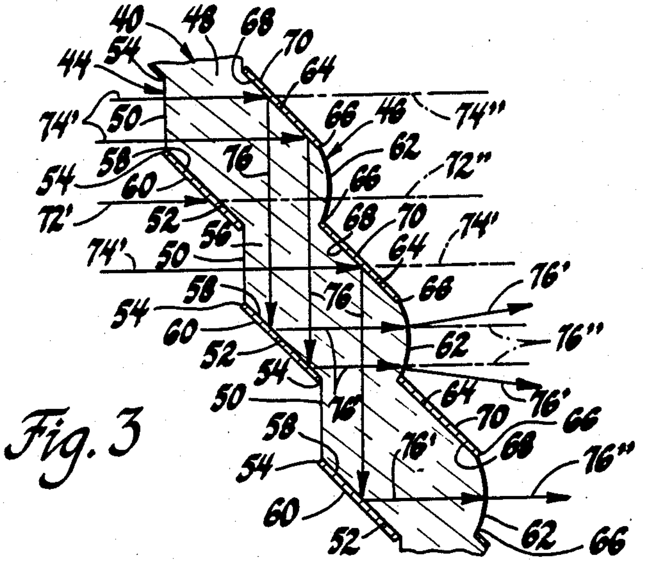
FIG. 3 is an enlarged view of a portion of the periscopic lens of FIG. 2 as indicated by circular arrow 3—3 of that Figure.

As is shown in greater detail in FIG. 3, periscopic lens 40 has a lens body 48 of a desired thickness commensurate with other portions of the lens, the size of the lamp assembly, and the distances between various portions of the lens inner and outer surfaces to be described. The lens inner surface 44 is formed with alternate first and second series of flat facets or surfaces 50 and 52 which are angularly connected at their adjoining edges 54 at about a 45° offset angle. In the preferred embodiment illustrated, the first and second series of facets and their adjoining edges are arranged to extend horizontally. It is to be understood, however, that they may have other arrangements without departing from the invention. It is desirable that the first and second series of flat facets have vertically extending components so that in a vertical direction they extend for the same height. For example, if the vertically extending first series of flat facets extend for a vertical height of 2 mm, the second series of flat facets 52 will be somewhat wider so that they extend for a vertical height of 2 mm. Their width would therefore be approximately 2.8 mm since they are at a 45° angle to the other series of flat facets. The first series of flat facets 50 are transparent so that light can readily enter the interior 56 of lens body 48 from the reflector and light source side. However, the second series of flat facets are provided with mirrored surfaces 58 facing the interior 56 of the lens body 48. The other side 60 of the mirrored surfaces 58 of facets 52 are opaque so that no light can be transmitted through facets 52 from the interior of the lamp assembly 26. Other sides 60 may be aluminized or black if desired.

Figure 4:
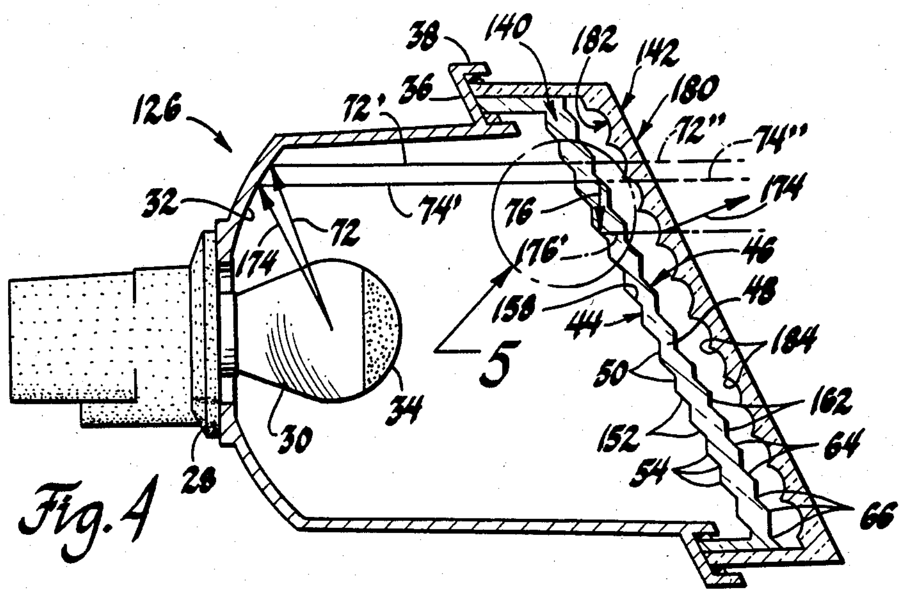
FIG. 4 is a view similar to FIG. 2 and showing a modification of the invention.
Figure 5:
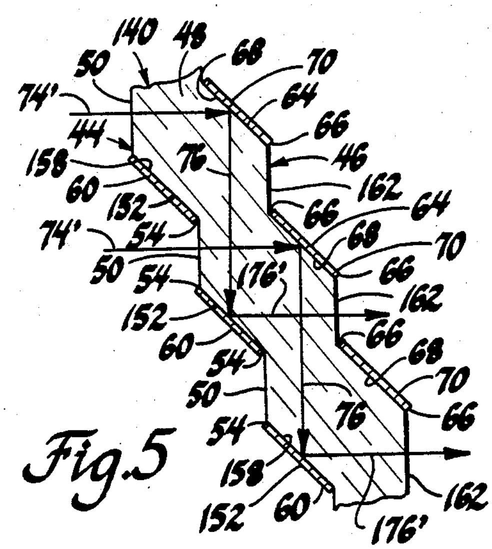
FIG. 5 is an enlarged fragmentary view of a portion of the periscopic lens of FIG. 4 taken in the direction of circular arrow 5 on that Figure.

The outer surface 46 has third and fourth series of facets 62 and 64 alternately arranged and joined at their adjacent edges 66, with the fourth facet series being positioned at about a 45° angle to the third facet series 62, similar to the series of facets on the inner surface of the lens. The third facet series 62 is arranged so that the facets are generally parallel to the facets forming the first facet series 50. The facets forming the fourth facet series 64 are arranged to be substantially parallel to the facets of second facet series 52. As will be further discussed with regard to FIGS. 4 and 5, the third facet series 62 are described as being only generally perpendicular. In the preferred embodiment of FIGS. 2 and 3, the third facet series 62 are provided with optical surfaces, and therefore are not flat. Instead, they may be curved as more particularly illustrated in FIG. 3 to redirect light rays going out of the lehs body, as will be later described. In the embodiment of FIGS. 4 and 5, the third series of facets are flat and substantially parallel to the first series of facets.

The facets of the third facet series 62 are so arranged as to be in alignment with the facets of the second facet series 52 in relation to the parallel light rays passing from the reflector 32, as will be further described. The facets of the fourth facet series 64 have mirrored surface treatments 68 with the mirrored surfaces facing the interior 56 of the lens body 48. Since the facets of the second facet series 52 and the facets of the fourth facet series 64 are parallel to each other, it follows that their mirrored surfaces are likewise parallel. The outer sides 70 of the mirrored surface treatment areas are preferably colored with the same coloration as that of adjacent body panels of the vehicle such as body panels 20 and 22. This assists in concealing the lamp assembly when the lamp is not energized. The vertical height of each facet of the third facet series 62 is preferably the same as the vertical height of each facet of the first facet series 50, and the vertical height of the fourth facet series 64 is preferably the same as the vertical height of the second facet series 52. Furthermore, an adjoining edge 66 joining a third series facet 62 with a fourth series facet 64 above it is preferably in parallel light ray path alignment with an adjoining edge 54 between a first series facet 50 and a second series facet 52 immediately below it. This alignment is in relation to the extended path of a parallel light ray leaving reflector 32 and arriving at lens 40.

The outer lens 42 in the preferred embodiment of FIGS. 2 and 3 is a flat surface lens having no optical properties which would tend to diffuse or otherwise redirect the light rays passing therethrough after they have passed through lens 40.

In order to discuss the transmission of light and its direction and control, reference is made to light rays being emitted by the light bulb 30. Assuming those light rays emit from the focal point of the reflector 32, two such light rays are illustrated. Light ray 72 impinges upon reflector 32 and is reflected along light ray path 72'. Light ray 72 travels along path 72' until it hits the other side 60 of the mirrored surface 58. Since that surface is opaque, the light ray cannot penetrate lens 40. Instead, it is absorbed, reflected or dissipated to the interior of the lamp assembly. The light ray path 72' is illustrated as having a further extended path 72" extending through the lens 40 and the lens 42. The arrangement is such that any light ray along a path parallel to light ray path 72' which impinges on the other side 60 of the mirrored surface 58 of the second facet series 52 will not enter lens 40. Thus, the sides 60 of the facets 52 effectively block any parallel light rays which strike them from directly passing through the lens body interior 56 and engaging or passing through the third facet series 62.

Another light ray 74 from the light source 30 is reflected from reflector 32 along light ray path 74'. This path is parallel to light ray path 72' since the light rays from the reflector toward lens 40 are parallel. Light ray 74, following path 74', will pass through a facet of the first facet series 50 and enter the interior 56 of the lens body 48. It will be reflected by the mirrored surface 68 of a facet of the fourth facet series 64 at a 90° angle to light ray path 74'. Instead of following the extended light ray path 74', light ray 74 will follow the light ray path 76 back through the lens body interior 56. It will then be reflected by the mirrored surface 58 of a facet of the second facet series 52, along light path 76', until it reaches a facet of the third facet series 62 and exits the lens.

In the embodiment shown in FIG. 2, the optical surfaces of each of the facets making up third facet series 62 will redirect the light ray 74 and other light rays parallel to it which have followed similar paths, so as to obtain a desired light path distribution beyond the lamp assembly 26 and the outer lens 42. In the particular embodiment illustrated, the light rays continue on paths 76" or are redirected upward or downward, depending upon the portion of the optical surface of each facet of facet series 62 through which each emerges from lens 40. This will result in an overall vertical spread of light from the entire assembly which will give the appearance- of a substantially completely lighted panel in the area of lamp assembly 26. This may be a type of light pattern desired for running lights, brake lights, or turn signals by way of example. Should it be desired to redirect the light more horizontally and downwardly, the optical surfaces of the third facet series 62 may be readily modified to obtain such a desired light distribution pattern. It is to be understood that other desired light distribution patterns may be obtained by controlling the optical surfaces.

The arrangement shown in FIGS. 4 and 5 is similar to that of FIGS. 2 and 3 except for the periscopic lens and the outer lens. Therefore, the same reference numerals for the same or closely related structures are used in these figures as are used in FIGS. 2 and 3 where appropriate. The lamp assembly 126 has a periscopic lens 140 similar in most respects to periscopic lens 40 of FIGS. 2 and 3 except that the facets of the third facet series 162 are flat instead of being formed as optical surfaces to redirect light rays passing therethrough. Therefore, light ray 174 following path 176' as it is reflected from the mirrored surface 158 of a facet 152 passes through the lens body, exiting the body through a facet 162 and continuing along the extended light ray path 176' outwardly of the lens body.

The outer lens 142, instead of having two flat surfaces, has one of the surfaces formed to provide series of optical surfaces. In the preferred embodiment of FIGS. 4 and 5, outer surface 180 remains flat and inner surface 182 is provided with a series of optical surfaces 184. Although the optical surfaces could be formed on outer surface 180, it is easier to keep the outer lens clean if its outer surface is flat and the inner surface 182 is the surface with the optical surfaces formed thereon. Each of the optical.surfaces 184 is positioned in light ray alignment with one facet of the third facet series 162 to provide the desired light distribution pattern beyond the outer lens. Each of the optical surfaces 184 is arranged so that it will receive any light ray traveling along a light ray path parallel to path 176', such light ray having exited periscopic lens 140 as above described. As is indicated in FIG. 4, the optical surfaces 184 may vertically redirect the light rays to provide a vertical spread as do the optical surfaces of the third facet series of FIGS. 2 and 3. Again, other light distribution pattern arrangements may be made by controlling the shape and position of the optical surfaces 184. This choice is not available when the optical surfaces must focus the light rays through narrow slits.

Figure 6:
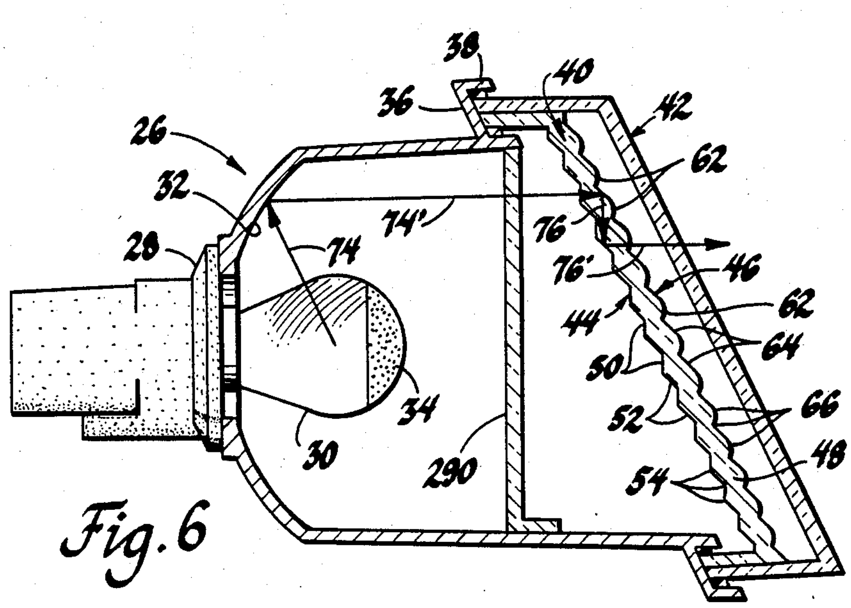
FIG. 6 is another view similar to that of FIG. 2, illustrating another feature of the invention.

The lamp assembly of FIG. 6 is the same as the lamp assembly of FIG. 2, with the addition of a colored lens 290 attached to the lamp assembly housing 36 so as to be between the periscopic lens 40 and the light bulb and reflector elements 30 and 32 of the lamp assembly. Lens 290 may be amber, if desired or red, by way of example. Therefore all of the light rays ultimately exiting the lamp assembly will be the same color as that of lens 290. It is also to be understood that instead of providing a separate lens 290, the periscopic lens 40 or 140 may be colored as appropriate and desired.

It can be seen that by use of this arrangement the light rays need not be focused through a narrow slit and then diffused therebeyond so that the light pattern outwardly of the lamp assembly is, of necessity, a scattering type of pattern. If needed and desired, the light distribution pattern may be leftwardly or rightwardly, upwardly or downwardly, or any combination thereof. Also, when the light bulb 30 is not energized, the view presented from the exterior of the vehicle has the effect of merging the panel and the lamp assembly or assemblies behind the panel into the adjoining body panels so that a smooth body panel appearance is presented.

The embodiments of the invention in which an exclusive property or privilege is claimed are defined as follows:

1. A periscopic lamp lens for use in a vehicle lamp assembly or the like, said lens comprising:

a transparent lens body having an inner surface on one side adapted to face a source of parallel light rays in the lamp assembly and an outer surface on the other side thereof adapted to face the outward side of the lamp assembly, said lens body inner surface being formed with alternating first and second series of flat facets angularly joined at their adjacent edges, said first series of flat facets being adapted to be substantially perpendicular to the paths of the parallel light rays from said parallel light ray source when said lens is in the lamp assembly, said second series of flat facets being at an offset angle to said first series of flat facets and having a mirrored surface treatment facing the interior of said lens body;

said lens body outer surface being formed with alternating third and fourth series of facets angularly joined at their adjacent edges, said third series of facets being adapted to be generally perpendicular to the extended paths of the parallel light rays from the source of parallel light rays but so positioned with respect to said second series of flat facets that no such parallel light rays may directly engage said third series of facets because said second series of flat facets block such parallel light rays from continuing therebeyond on their extended paths, said fourth series of facets being flat facets and parallel to said second series of flat facets and having a mirrored surface treatment facing the interior of said lens body and being so positioned with respect to said first series of flat facets that when said lens is in the lamp assembly parallel light rays from the parallel light ray source pass through said first series of flat facets and said lens body to said fourth series of facets and are reflected by the mirrored surfaces of said fourth series of facets back through said lens body to said second series of flat facets and are then reflected by the mirrored surfaces of said second series of flat facets again through said lens body and then through said third series of facets and then outwardly of said lens and outwardly of the lamp assembly.

2. In a lamp assembly for a vehicle or the like, the lamp assembly including a housing provided with a reflector and a light bulb, light from the light bulb being reflected by the reflector so as to be in the form of parallel light rays directed outwardly of the reflector toward a lens;

said lens being a periscopic lens and comprising:

a transparent lens body located adjacent the outer end of the reflector and having an inner surface on one side facing the light bulb and an outer surface on the other side thereof, said lens body inner surface being formed with alternating first and second series of flat facets angularly joined at their adjacent edges, said first series of flat facets being substantially perpendicular to the parallel light rays from said light bulb as reflected by the reflector, said second series of flat facets being at about a 45 degree angle to said first series of flat facets and having a mirrored surface treatment facing the interior of said lens body;

said lens body outer surface being formed with alternating third and fourth series of facets angularly joined at their adjacent edges, said third series of facets being generally perpendicular to the extended paths of the parallel light rays from the light bulb as reflected by the reflector but being so positioned with respect to said second series of flat facets that no such parallel light rays may directly engage said third series of facets because said second series of flat facets block such parallel light rays from continuing therebeyond on their extended paths, said fourth series of facets being flat facets and parallel to said second series of flat facets and having a mirrored surface treatment facing the interior of said lens body and being so positioned with respect to said first series of flat facets that parallel light rays from the light bulb as reflected by the reflector pass through said first series of flat facets and said lens body to said fourth series of facets and are reflected by the mirrored surfaces of said fourth series of facets back through said lens body to said second series of flat facets and are then reflected by the mirrored surfaces of said second series of flat facets and again pass through said lens body and then through said third series of facets and then outward of said lamp assembly.

3. In a lamp assembly for a vehicle or the like, the lamp assembly including a housing provided with a reflector and a light bulb and an outer lens connected to the housing opposite the reflector, light from the light bulb being reflected by the reflector so as to be in the form of parallel light rays directed outwardly of the reflector toward the outer lens;

a periscopic inner lens comprising:

a transparent lens body located adjacent the outer lens and having an inner surface facing the light bulb and an outer surface facing the outer lens, said lens body inner surface being formed with alternating first and second series of flat facets angularly joined at their adjacent edges, said first series of flat facets being substantially perpendicular to the parallel light rays from said light bulb as reflected by the reflector, said second series of flat facets being at about a 45 degree angle to said first series of flat facets and having a mirrored surface treatment facing the interior of said lens body;

said lens body outer surface being formed with alternating third and fourth series of facets angularly joined at their adjacent edges, said third series of facets being generally perpendicular to the extended paths of the parallel light rays from the light bulb as reflected by the reflector but being positioned with respect to said second series of flat facets that no such parallel light rays may directly engage said third series of facets because said second series of flat facets block such parallel light rays from continuing therebeyond on their extended paths, said fourth series of facets being flat facets and parallel to said second series of flat facets and having a mirrored surface treatment facing the interior of said lens body and being so positioned with respect to said first series of flat facets that parallel light rays from the light bulb as reflected by the reflector pass through said first series of flat facets and said lens body to said fourth series of facets and are reflected by the mirrored surfaces of said fourth series of facets back through said lens body to said second series of flat facets and are then reflected by the mirrored surfaces of said second series of flat facets and again pass through said lens body and then pass through said third series of facets and outward of said lamp assembly through the outer lens.

4. In a lamp assembly for a vehicle or the like, said lamp assembly including a housing provided with a reflector and a light bulb and an outer lens connected to the housing opposite the reflector, light from the light bulb being reflected by the reflector so as to be in the form of parallel light rays directed outwardly of the reflector toward the outer lens;

a periscopic inner lens comprising:

a transparent lens body located adjacent the outer lens and having an inner surface facing the light bulb and an outer surface facing the outer lens, said lens body inner surface being formed with alternating first and second series of flat facets angularly joined at their adjacent edges, said first series of flat facets being substantially perpendicular to the parallel light rays from said light bulb as reflected by the reflector, said second series of flat facets being at about a 45 degree angle to said first series of flat facets and having a mirrored surface treatment facing the interior of said lens body;

said lens body outer surface being formed with alternating third and fourth series of flat facets angularly joined at their adjacent edges, said third series of flat facets being substantially perpendicular to the extended paths of the parallel light rays from the light bulb as reflected by the reflector but being so positioned with respect to said second series of flat facets that no such parallel light rays may directly engage said third series of flat facets because said second series of flat facets block such parallel light rays from continuing therebeyond on their extended paths, said fourth series of flat facets being parallel to said second series of flat facets and having a mirrored surface treatment facing the interior of said lens body and being so positioned with respect to said first series of flat facets that parallel light rays from the light bulb as reflected by the reflector pass through said first series of flat facets and said lens body to said fourth series of flat facets and are reflected by the mirrored surfaces of said fourth series of flat facets back through said lens body to said second series of flat facets and are then reflected by the mirrored surfaces of said second series of flat facets again through said lens body and then outwardly through said third series of facets and then to the outer lens in alignment with the extended paths of the parallel light rays blocked by said second series of flat facets, said outer lens having optical surfaces formed thereon through which the light rays from said inner lens pass and then pass outward of said lamp assembly, said optical surfaces refracting said rays to obtain a desired light distribution pattern beyond the outer lens.

5. In a lamp assembly for a vehicle or the like, the lamp assembly including a housing provided with a reflector and a light bulb and an outer lens connected to the housing opposite the reflector, light from the light bulb being reflected by the reflector so as to be in the form of parallel light rays directed outwardly of the reflector toward the outer lens;

a lens arrangement including said outer lens and a periscopic inner lens, said periscopic inner lens comprising:

a transparent lens body located adjacent the outer lens and having an inner surface facing the light bulb and an outer surface facing said outer lens, said lens body inner surface being formed with alternating first and second series of flat facets angularly joined at their adjacent edges, said first series of flat facets being substantially perpendicular to the parallel light rays from said light bulb as reflected by the reflector, said second series of flat facets being at about a 45 degree angle to said first series of flat facets and having a mirrored surface treatment facing the interior of said lens body;

said lens body outer surface being formed with alternating third and fourth series of facets angularly joined at their adjacent edges, said third series of facets being optical surfaces which are generally perpendicular to the extended paths of the parallel light rays from the light bulb as reflected by the reflector but being so positioned with respect to said second series of flat facets that no such parallel light rays may directly engage said third series of facets because said second series of flat facets block such parallel light rays from continuing therebeyond on their extended paths, said fourth series of facets being flat facets and being parallel to said second series of flat facets and having a mirrored surface treatment facing the interior of said lens body and being so positioned with respect to said first series of flat facets that parallel light rays from the light bulb as reflected by the reflector pass through said first series of flat facets and said lens body to said fourth series of facets and are reflected by the mirrored surfaces of said fourth series of facets back through said lens body to said second series of flat facets and are then reflected by the mirrored surfaces of said second series of flat facets again through said lens body and then through said optical surfaces of said third series of facets and then outward of the lamp assembly through the outer lens, said optical surfaces redirecting said light rays to obtain a desired light distribution pattern beyond said outer lens.

6. The invention of any one of Claims 2, 3, 4 or 5 having colored lens means through which pass at least the light rays passing outward of the lamp assembly for directing colored light beyond the lamp assembly.

7. The invention of any one of Claims 1, 2, 3, 4, or 5 in which said facets and their joined edges are arranged to extend horizontally.

8. The invention of any one of Claims 1, 2, 3, 4 or 5 in which the outer surfaces of said fourth series of facets are colored outward of said mirrored surface treatment in coordination with the color of portions of the vehicle or the like in which the lamp assembly having said periscopic lens therein is installed to visually merge the lamp assembly with those other portions and give an appearance concealing the lamp assembly while the parallel light rays are not present.

* * * * *